United States Patent
Park et al.

(10) Patent No.: US 7,952,974 B2
(45) Date of Patent: *May 31, 2011

(54) APPARATUS AND METHOD FOR MEASURING SIGNAL QUALITY

(75) Inventors: Hyun-soo Park, Seoul (KR); Jae-seong Shim, Seoul (KR); Jae-wook Lee, Osan-si (KR); Jung-hyun Lee, Seoul (KR); Eun-jin Ryu, Suwon-si (KR); Eing-seob Cho, Yongin-si (KR)

(73) Assignee: Samung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,793

(22) Filed: Jul. 9, 2010

(65) Prior Publication Data
US 2010/0278027 A1    Nov. 4, 2010

Related U.S. Application Data

(63) Continuation of application No. 10/931,254, filed on Sep. 1, 2004, now Pat. No. 7,801,005.

(30) Foreign Application Priority Data

Sep. 16, 2003    (KR) .................................. 2003-64158

(51) Int. Cl.
*G11B 7/00* (2006.01)
(52) U.S. Cl. ............... 369/59.17; 369/59.18; 369/59.21; 369/59.27

(58) Field of Classification Search ............... 369/59.17, 369/59.18, 59.21, 59.22, 59.26, 59.27
See application file for complete search history.

(56) References Cited

U.S. PATENT DOCUMENTS

| | | | |
|---|---|---|---|
| 5,287,385 | A | 2/1994 | Sugawara et al. |
| 5,486,956 | A | 1/1996 | Urata |
| 5,588,011 | A | 12/1996 | Riggle |
| 6,798,363 | B2 | 9/2004 | Rapp |
| 2001/0016002 | A1 | 8/2001 | Shim et al. |
| 2002/0071194 | A1 | 6/2002 | Honma |

FOREIGN PATENT DOCUMENTS

EP    1 098 313 A2    5/2001

OTHER PUBLICATIONS

Korean Office Action issued on Dec. 21, 2009, in counterpart Korean Application No. 2003-64158 (citing US 2002/0071194 first cited in Office Action of Dec. 30, 2008, issued in present application) (4 pages, in Korean, no English translation).

*Primary Examiner* — Jorge L Ortiz Criado
(74) *Attorney, Agent, or Firm* — NSIP Law

(57) ABSTRACT

An apparatus and method for measuring the quality of a signal on an optical disc based on level information of a viterbi decoder are provided. The signal quality measuring apparatus includes: a binary unit that generates binary signals from input RF signals; a channel identifier that receives the input RF signals and the binary signals output from the binary unit and outputs reference level values corresponding to the binary signals; and an information calculator that receives the reference level values and detects a signal quality value.

18 Claims, 10 Drawing Sheets

APPARATUS AND METHOD FOR MEASURING SIGNAL QUALITY

CROSS-REFERENCE TO RELATED APPLICATIONS

This application is a continuation of U.S. patent application Ser. No. 10/931,254, filed on Sep. 1, 2004, which claims the benefit of Korean Patent Application No. 2003-64158, filed on Sep. 16, 2003, in the Korean Intellectual Property Office, the disclosure of each of which is incorporated herein in its entirety by reference.

BACKGROUND

1. Field

The following description relates to an apparatus and method for measuring signal quality, and more particularly, to an apparatus and method for measuring signal quality that detects the quality of a signal reproduced from an optical disc according to level information of a viterbi decoder.

2. Description of the Related Art

An optical disc drive writes binary signals on a disc surface and reproduces data by radiating a laser beam on the disc surface and analyzing the reflected waveform. The signal read from the disc surface is a radio frequency (RF) signal. Further, even when binary signals are recorded on the disc surface, the RF signal read from the disc surface has features of an analog signal, not a binary signal, due to disc characteristics and optical characteristics.

The features of the analog signal can be used for various purposes, such as quality control of a manufactured disc. Representative features of the analog signal are an asymmetry value and a modulation ratio. The asymmetry value, which is an indicator representing how far the center portion of a signal is located from a total signal, is typically defined as shown in the following Equation 1. The modulation ratio, which is an indicator representing how far an amplitude of a signal with a short time period (T) is apart from an amplitude of a total signal, is typically defined as shown in the following Equation 2.

asymmetry value={(longest $T$ top level+longest $T$ bottom level)/2−(shortest $T$ top level−shortest $T$ bottom level)/2}/(longest $T$ top level−longest $T$ bottom level)   Equation 1 modulation ratio=(shortest $T$ top level−shortest $T$ bottom level)/(longest $T$ top level−longest $T$ bottom level)   Equation 2

FIG. 1 is a block diagram of a conventional signal quality measuring apparatus for obtaining the asymmetry value and the modulation ratio. The conventional technology is disclosed in U.S. Pat. No. 5,490,127.

Referring to FIG. 1, after an RF signal read from a disc is transmitted through a slicer circuit 41 and 42, a sign (+ or −) of the RF signal is determined, and after the sign determined RF signal goes through a specific period (positive or negative) edge detection circuit 43a and 43b and sample pulse generators 44a and 44b, shortest T and longest T sample pulses are obtained. FIG. 1 shows a sample waveform of a signal in which the shortest T is 3 seconds. After the sample pulses go through a respective sample and hold circuit 46a and 46b and a peak bottom hold circuit 48a and 48b, peak values 3TTOP and RFTOP and bottom values 3TBTM and RFBTM are obtained.

The asymmetry value and modulation ratio are calculated by passing the peak values 3TTOP and RFTOP and the bottom values 3TBTM and RFBTM through an equivalent circuit (not shown) to calculate Equations 1 and 2.

However, since the conventional signal quality detecting apparatus described above detects peak values and bottom values by sampling only specific sample waveforms of RF signals read from a disc, the peak values and bottom values cannot be precisely calculated.

Also, when a shortest T is changed, that is, though 2T is used as the shortest T in a disc writing method at first, when 3T is used instead of 2T in the disc writing method after it is determined that the asymmetry value and modulation ratio cannot be detected using 2T, a hardware configuration 51 through 58 shown in FIG. 1 must be reconfigured, and the reconfiguration is difficult and time consuming.

SUMMARY

An aspect provides an apparatus and method for measuring signal quality, which are capable of calculating an asymmetry value and a modulation ratio more precisely.

An aspect also provides an apparatus and method for measuring signal quality, which are capable of calculating an asymmetry value and a modulation ratio more easily when a shortest T is changed.

An aspect provides a signal quality measuring apparatus including: a binary unit, which generates binary signals from input RF signals; a channel identifier, which receives the input RF signals and the binary signals output from the binary unit and outputs reference level values corresponding to the binary signals; and an information calculator, which receives the reference level values and detects a signal quality value. In this aspect, the binary unit includes a viterbi decoder or a slicer.

According to another aspect, the channel identifier detects the reference level values on the basis of RF signals input during a predetermined time period. More particularly, the channel identifier detects each reference level value by obtaining an average value of the input RF signal and a previous reference level value.

According to another aspect, the channel identifier includes: a selection signal generator, which generates selection signals from output signals of the viterbi decoder; a level selector, which selects a level to be detected from the input RF signal in response to the selection signals; and an average value filter unit, which generates new level values for the selected levels on the basis of previous level values and level values of signals input to the selected levels. The selection signal generator generates selection signals by multiplexing delayed signals, which are delayed according to the number of viterbi decoder taps, output from the viterbi decoder, and the average value filter unit detects each reference level by following the Equation, reference level value=previous level value+(delayed input signal−previous level value)/constant number.

According to another aspect, the information calculator includes: at least one average unit, which generates an average value of reference level values having a same digital sum value among received reference level values; and a signal quality calculator, which receives the reference level values and the average values of the reference level values and generates a signal quality value. In this aspect, signals with a shortest T are removed from binary signals represented by the reference level values having a same digital sum value.

According to another aspect, the apparatus further includes a run length compensator, which detects and compensates signals with a T below the shortest T that do not coincide with a code condition, wherein the run length compensator is placed after the binary unit.

According to another aspect, the apparatus further includes a nonlinear converter, which converts the input RF signals so as to have a nonlinear response, wherein the nonlinear converter is placed before the binary unit. Here, it is preferable that the nonlinear converter comprises a nonlinear function unit, wherein the nonlinear function unit has a conversion function represented by the following Equation, $$y = x * [\{a=0\} * \{|x| <= k\} + \{a=1\} * \{|x| > k\}] + k * (-1)^{[\{a=0\} * \{|x| <= 0\} + \{a=1\} * \{|x| > 0\}]} *$$

$$[\{a=0\} * \{|x| > k\} + \{a=1\} * \{|x| > k\}].$$

According to another aspect, there is provided a signal quality measuring method comprising: generating binary signals from input RF signals; receiving the input RF signals and binary signals output from the binary unit and outputting reference level values corresponding to the binary signals; and receiving the reference level values and detecting a signal quality value.

Additional aspects and/or advantages will be set forth in part in the description which follows and, in part, will be obvious from the description, or may be learned by practice of embodiments.

Figure 1:
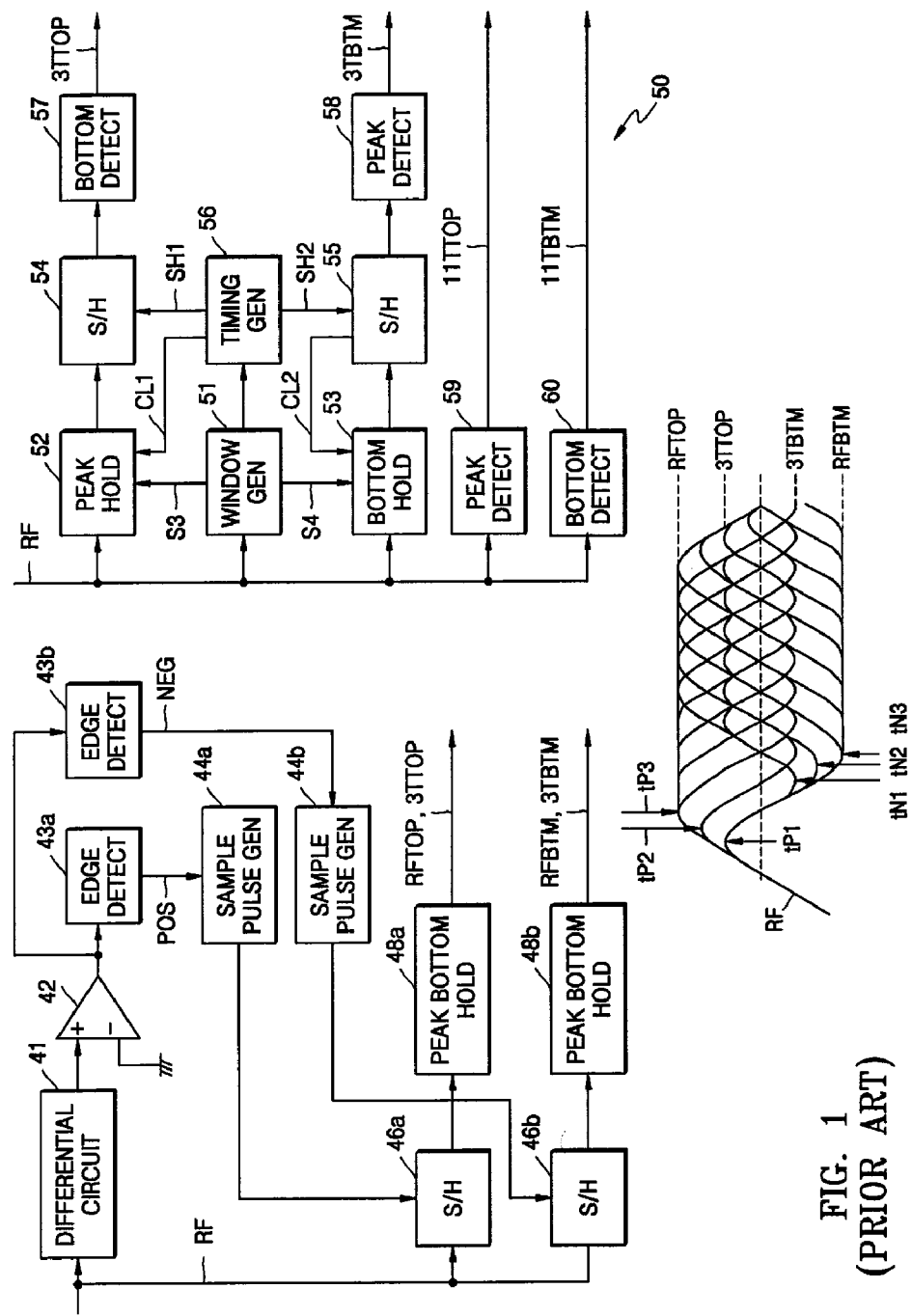
FIG. 1 is a block diagram of a conventional signal quality measuring apparatus for obtaining an asymmetry value and a modulation ratio.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 2:
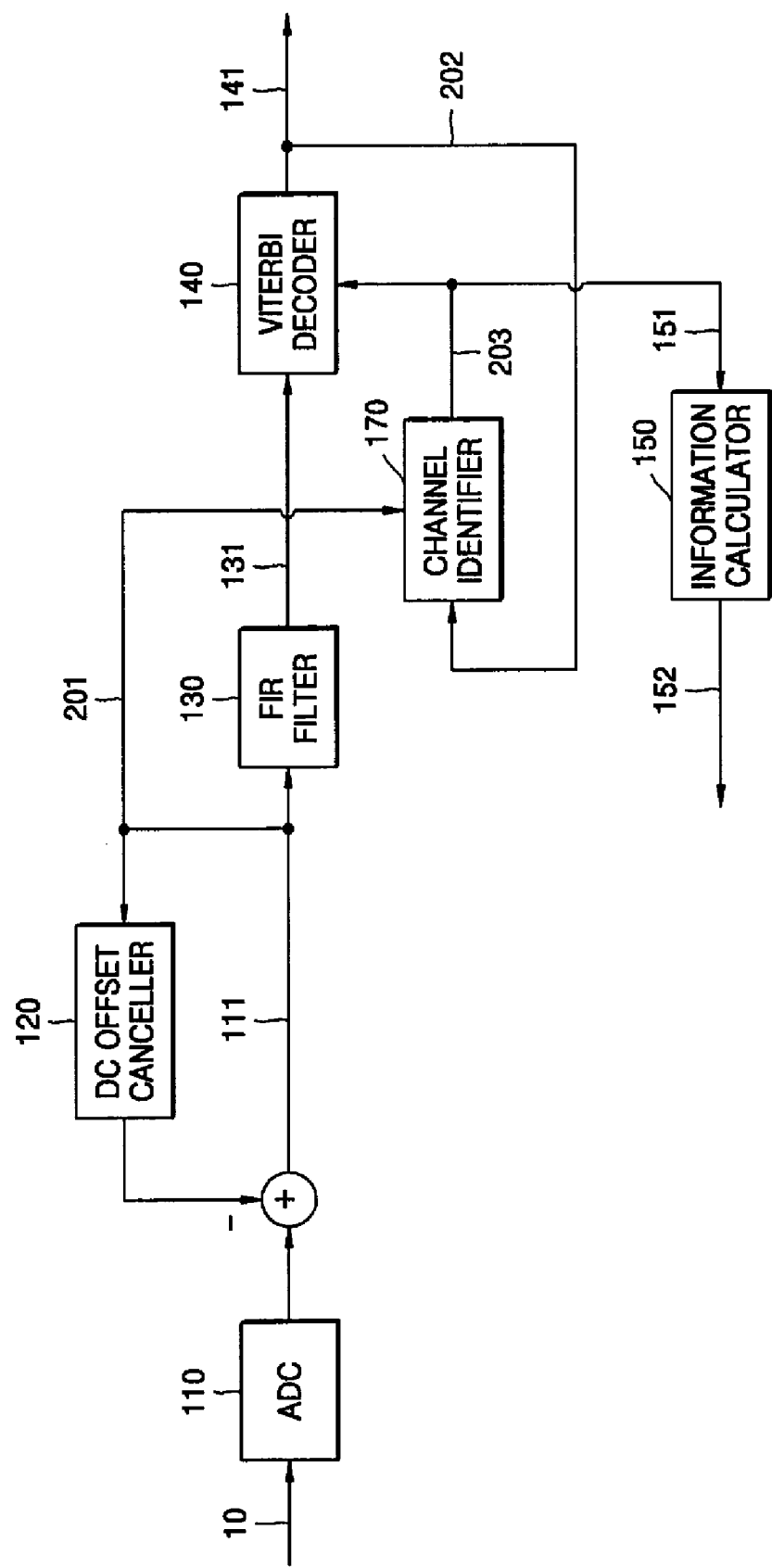
FIG. 2 is a block diagram of a signal quality measuring apparatus according to an aspect.

FIG. 2 is a block diagram of a signal quality measuring apparatus according to an aspect. A signal quality measuring apparatus includes an analog-to-digital (AD) converter 110, a direct current (DC) offset canceller 120, and an equalizer 130. RF signals 10 read from a disc by a pickup unit (not shown) are analog-to-digital converted by the AD converter 110. DC components of the converted digital signals are cancelled by the DC offset canceller 120, and the signals output from the DC offset canceller 120 are equalized by the equalizer 130 so that signals of every period have similar levels. If signal quality is satisfactory, the equalizer 130 can be omitted. The equalizer 130 is commonly made up of an FIR filter. Output signals 131 of the equalizer 130 are channel decoded by a viterbi decoder 140, and accordingly, binary signals 141 are obtained.

The signal quality measuring apparatus may further include a channel identifier 170 and/or an information calculator 150.

The channel identifier 170 receives output signals 202 of the viterbi decoder 140 and input signals 111 of the equalizer 130 and detects appropriate level values 203 to be used as reference levels for the viterbi decoder 140.

The information calculator 150 receives the appropriate level values 203 determined by the channel identifier 170 and calculates an asymmetry value and a modulation ratio.

According to an aspect, the asymmetry value and modulation ratio are calculated on the basis of the selected appropriate level values 203, i.e. output signals 203 of the channel identifier 170, unlike in a conventional apparatus, which calculates the asymmetry value and modulation ratio on the basis of peak values and bottom values extracted from sample signals of a shortest T and a longest T.

Figure 3:
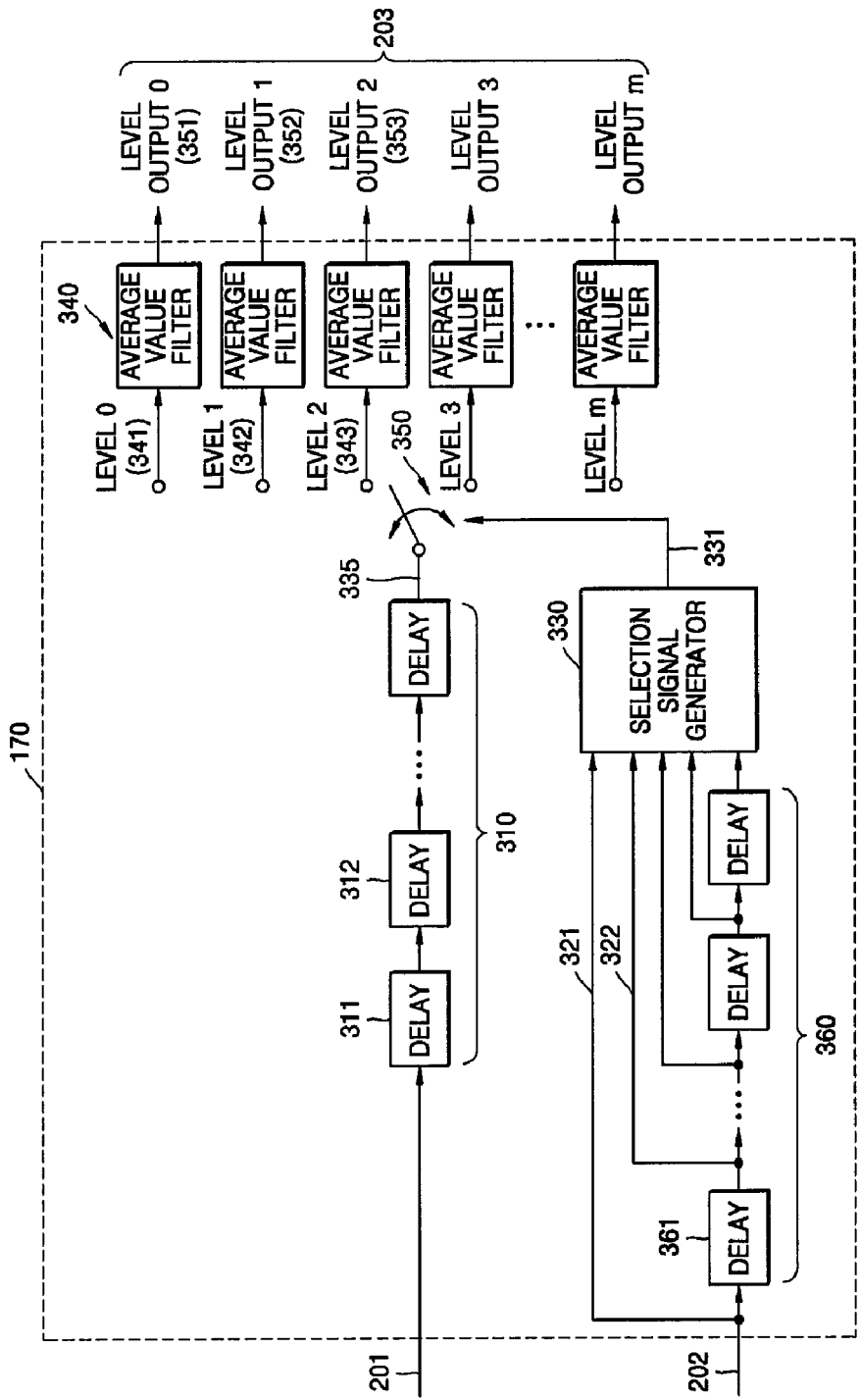
FIG. 3 is a block diagram of a channel identifier of FIG. 2.

FIG. 3 is a block diagram of the channel identifier 170 of FIG. 2. The channel identifier 170 includes a selection signal generator 330, a level selector 350, and an average value filter unit 340. The selection signal generator 330 receives output signals 202 of the viterbi decoder 140 and generates selection signals 331. Here, the output signals 202 of the viterbi decoder 140 are binary signals having a value of 0 or 1 and are final outputs decoded by the viterbi decoder 140.

According to an operation theory of a viterbi decoder, an output signal of the viterbi decoder is related to an input signal of the viterbi decoder, i.e., an output signal of an equalizer, and this indicates that the output signal of the viterbi decoder can specify a type of level input to the viterbi decoder. For example, when signal levels are generated by a PR (1, 2, 1) and a code type is (1, 7), showable ideal level values are 4, 2, −2, and −4. If input signal levels are 4, 4, 4, 2, −2, −4, −4, −4, −2, 2, . . . , output signals of the viterbi decoder corresponding to the input signal levels are 1, 1, 1, −1, −1, −1, −1, −1, 1, 1, . . . . Here, when the output signals of the viterbi decoder are multiplexed as many times as the number of viterbi decoder taps, 111, 11-1, 1-1-1, −1-1-1, . . . are generated, and if the values are represented as binary signals, they are 111, 110, 100,000, . . . . Therefore, these binary signals indicate that 4, 2, −2, −4, . . . were input, respectively. Accordingly, each of the binary signals 111, 110, 100,000, . . . can be used as a selection signal for specifying kinds of level values such as 4, 2, −2, −4, . . . . The selection signals 331 are shown in FIG. 3.

The output signals 202 of the viterbi decoder 140 input to the channel identifier 170 are delayed and separated by at least one of the plurality of delayer 360, corresponding to a predetermined number (the number of viterbi decoder taps —1) and input to the selection signal generator 330. The input delayed signals 321, 322, . . . are summed by the selection signal generator 330, and the selection signal generator 330 generates selection signal 331 with a binary signal pattern. For example, when the number of viterbi decoder taps is 3, the number of delayers is 2, and a pattern of the selection signal 331 is 111, 110, 100, 000, . . . . The delayers 360, are used because outputs of the viterbi decoder 140 are each output after taking a calculating time period equal to a predetermined cycle of a system clock and the outputs are not output simultaneously. In other words, a delay time corresponding to the calculating time must be assigned to the input signal 202 of the channel identifier 170 in order to select an input signal corresponding to an output signal of the viterbi decoder 140.

Selection signals 331 that correspond to removable viterbi paths according to a shortest T signal condition can be removed. For example, when a 3-tap viterbi decoder using a (1, 7) code is used, selection signals 331 with 010 and 101 corresponding to 1T are removed, and the number of selectable signals is 6, the selectable signals being 000, 001, 011, 100, 110, and 111. Likewise, when a 5-tap viterbi decoder using a (1, 7) code is used, only 16 levels are required, and accordingly, 16 signals are generated as selection signals. When outputs of a viterbi decoder are correct, no signals with 1T are generated as the outputs of the viterbi decoder, and accordingly, a special configuration for generating the selection signals 331 is not required.

Input signals 201 of the equalizer 130 are also input to the channel identifier 170. The input signals 201 of the equalizer 130 are electrical signals to be decoded having consecutive values. The input signals 201 have real values that are different from ideal reference levels. The input signals 201 of the channel identifier 170 are transmitted through delays 311, 312, . . . corresponding to the number of memories (M) of the viterbi decoder 140 and are input to the level selector 350. The level selector 350 transfers the input signals 201 of the channel identifier 170 to the average value filters 340 corresponding to levels according to the selection signals 331, respectively. Each of the average value filters 340 corresponds to each level of the viterbi decoder 140. Accordingly, the number of average value filters 340 is the same as the number of levels of the connected viterbi decoder 140. None of the required paths can be removed.

Each of the average value filters 340 discussed above obtains an average value of each of the selected input signals 341, 342, 343, . . . at a predetermined time and outputs the average value as each of new level values 351, 352, 353, . . . . A low pass filter may be used as the average value filter 340. As such, a feature of estimating a DC average value in the low pass filter is estimated. Another type of the average value filter 340 uses the following Equation 3.

$$L'=L+(I-L)/C \qquad \text{Equation 3}$$

The L' is a variable for each of level values 351, 352, . . . updated by newly input signals, L is a variable for a previous level value. I is a variable for each of delayed input signals 351, 352. C is a variable for a constant number. The greater the constant number C, the less the level values L' to be updated vary, and accordingly, a tracking level decreases.

Figure 4:
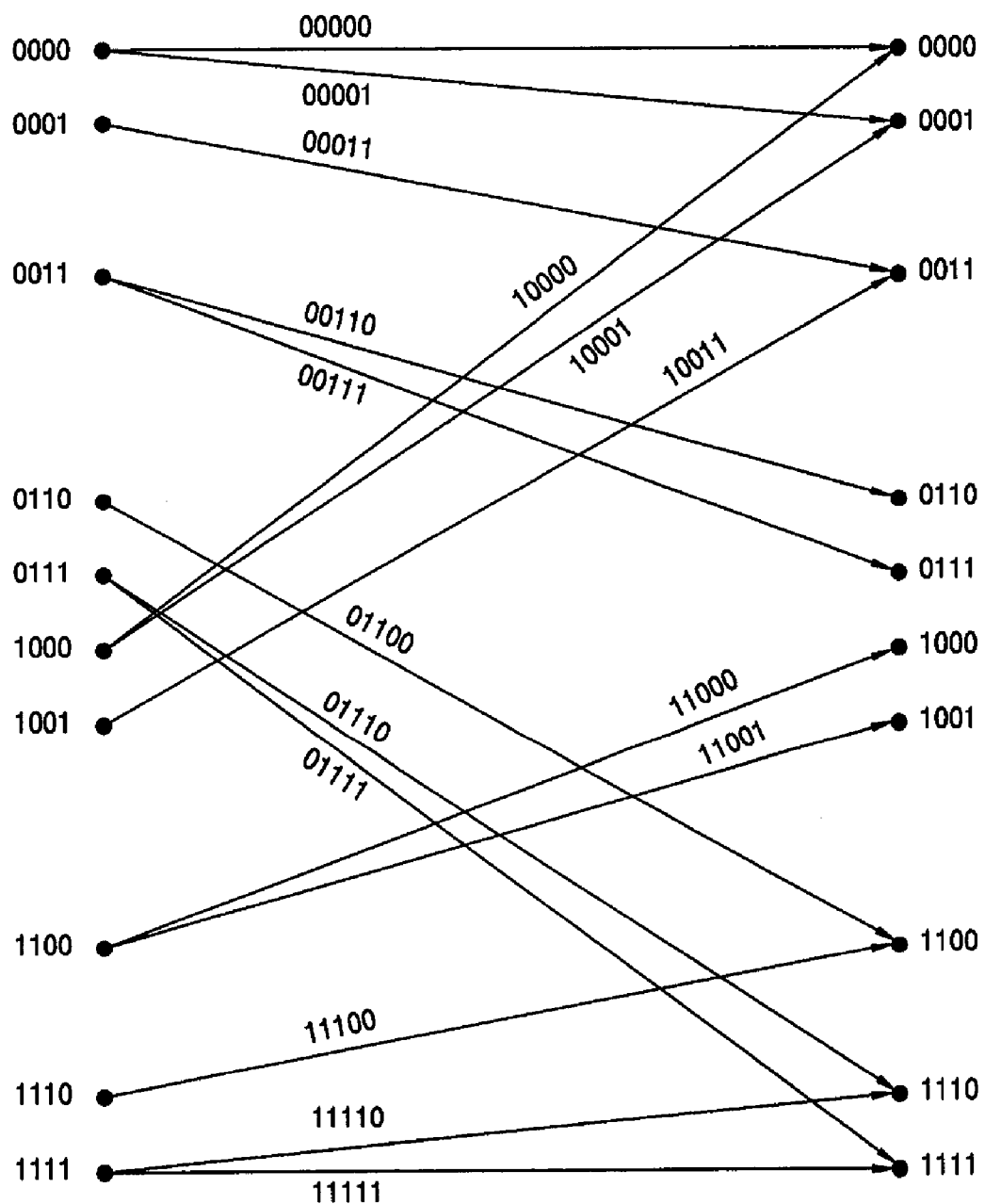
FIG. 4 is a Trellis diagram illustrating an algorithm of a typical 5-tap viterbi decoder according to an aspect.

FIG. 4 is a Trellis diagram illustrating an algorithm of a typical 5-tap viterbi decoder according to an aspect. Nodes on the left indicate to a viterbi decoder states of input signals received in a previous state, and nodes on the right indicate to the viterbi decoder states of input signals received in a next state. Since a 5-tap viterbi decoder is used, a state transition is represented with 5 bits, and since a (1, 7) code is used, states where a shortest T is 1 are removed. Accordingly, state variation has $2^5-16=16$ state transitions.

Figure 5:
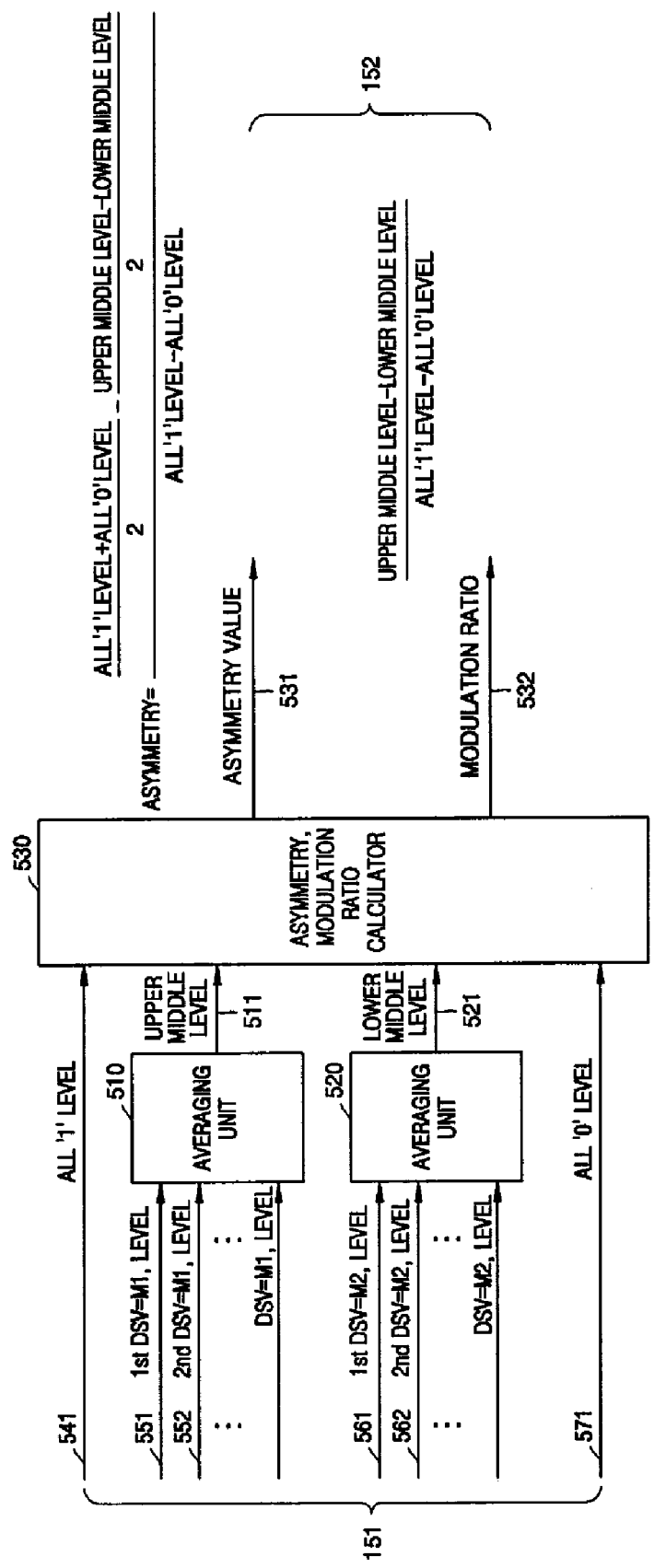
FIG. 5 is a block diagram of an information calculator according to an aspect.

FIG. 5 is a block diagram of an information calculator 150 according to an aspect. The information calculator 150 includes averaging units 510 and 520 and a signal quality calculator 530. The information calculator 150 calculates several measuring data, for example, an asymmetry value and a modulation ratio, required in a system using level values 203 output from the channel identifier 170.

The asymmetry value is an indicator representing how much a signal with a short period is biased when the signal with a short period is placed at another position not a center position. The asymmetry value in the invention is defined by a level 541 detected when input signals are all 1, a level 571 detected when input signals are all 0, and levels 511 and 521 detected when signals with a specified period are input. Here, the level 541 detected when input signals are all 1 is defined as an uppermost level, the level 571 detected when input signals are all 0 is defined as a lowest level, and the levels 511 and 521 detected when signals with a specified period are input are defined as an upper middle level and a lower middle level, respectively.

In general, a maximum value of input RF signals becomes the uppermost level 541, and a minimum value of the input RF signals becomes the lowest level 571. However, It is understood that various values can become the upper middle level 511 or the lower middle level 521 according to a digital sum value (DSV). The DSV is a value obtained by summing values of input signals by substituting an input signal of 1 with +1 and an input signal of 0 with −1. For example, if a value of 11001 is input, the DSV is +1+1−1−1+1=+1. The upper and lower middle levels 511 and 521 are obtained by averaging input signals 551, 552, . . . and input signals 561, 562, . . . in the averaging units 510 and 520, respectively. Here, the input signals 551, 552, . . . are the level values 151 of signals having a DSV of M1, respectively, and the input signals 561, 562, . . . are level values 151 of signals having a DSV of M2, respectively. Here, the level values 151 are output signals of the channel identifier 170.

The signal quality calculator 530 calculates the asymmetry value and modulation ratio on the basis of the uppermost level 541, the lowest level 571, the upper middle level 511, and the lower middle level 521. Here, the asymmetry value and modulation ratio are calculated by the following Equations 4 and 5, respectively.

$$\text{asymmetry value} = \{(\text{uppermost level} + \text{lowest level})/2 - (\text{upper middle level} - \text{lower middle level})/2\}/(\text{uppermost level} - \text{lowest level}) \qquad \text{Equation 4}$$

$$\text{modulation ratio} = (\text{upper middle level} - \text{lower middle level})/(\text{uppermost level} - \text{lowest level}) \qquad \text{Equation 5}$$

As compared with conventional Equations for the asymmetry value and modulation ratio, the uppermost level 541 corresponds with a longest T top level RFTOP, the lowest level 571 corresponds with a longest T bottom level RFBTM, the upper middle level 511 corresponds with a shortest T top level 3TTOP, and the lower middle level 521 corresponds with a shortest T bottom level 3TBTM.

The DSVs selected as the upper middle level 511 and the lower middle level 521 may vary according to the asymmetry value and modulation ratio defined by a user. In another aspect, the number of input signals 551, 552, . . . input to the average unit 510 equals to the number of input signals 561, 562, . . . input to the average unit 520, and second, a pattern of the DSV of the input signals 551, 552, . . . input to the average unit 510 is the inverse of a pattern of the DSV of the input signals 561, 562, . . . input to the average unit 520. For example, when an input signal with a level 11001 is input to the average unit 510, another input signal exits with a level 00110 input to the average unit 520.

The signals 551, 552, . . . and 561, 562, . . . input to the average units 510 and 520 cannot have shortest T level values due to a code condition. In another aspect, only input signals of levels having a number of consecutive bits equal to the shortest T are selected to obtain the upper and lower middle levels 511 and 521. For example, if the shortest T is 2T, input signals with levels 11001 and 10011 may be selected, however, an input signal with a level 11100 cannot be selected. This is because signal quality of the shortest T drastically influences the total signal quality.

Unlike the shortest T top level and shortest T bottom level, which are level values generated from one sample signal, the upper and lower middle levels 511 and 521 are average values of level values of signals input during a predetermined time period. Therefore, the asymmetry value 531 and the modulation ratio 532 calculated on the basis of the upper and lower middle levels 511 and 521 can express characteristics of RF signals read from a disc more exactly.

Figure 6:
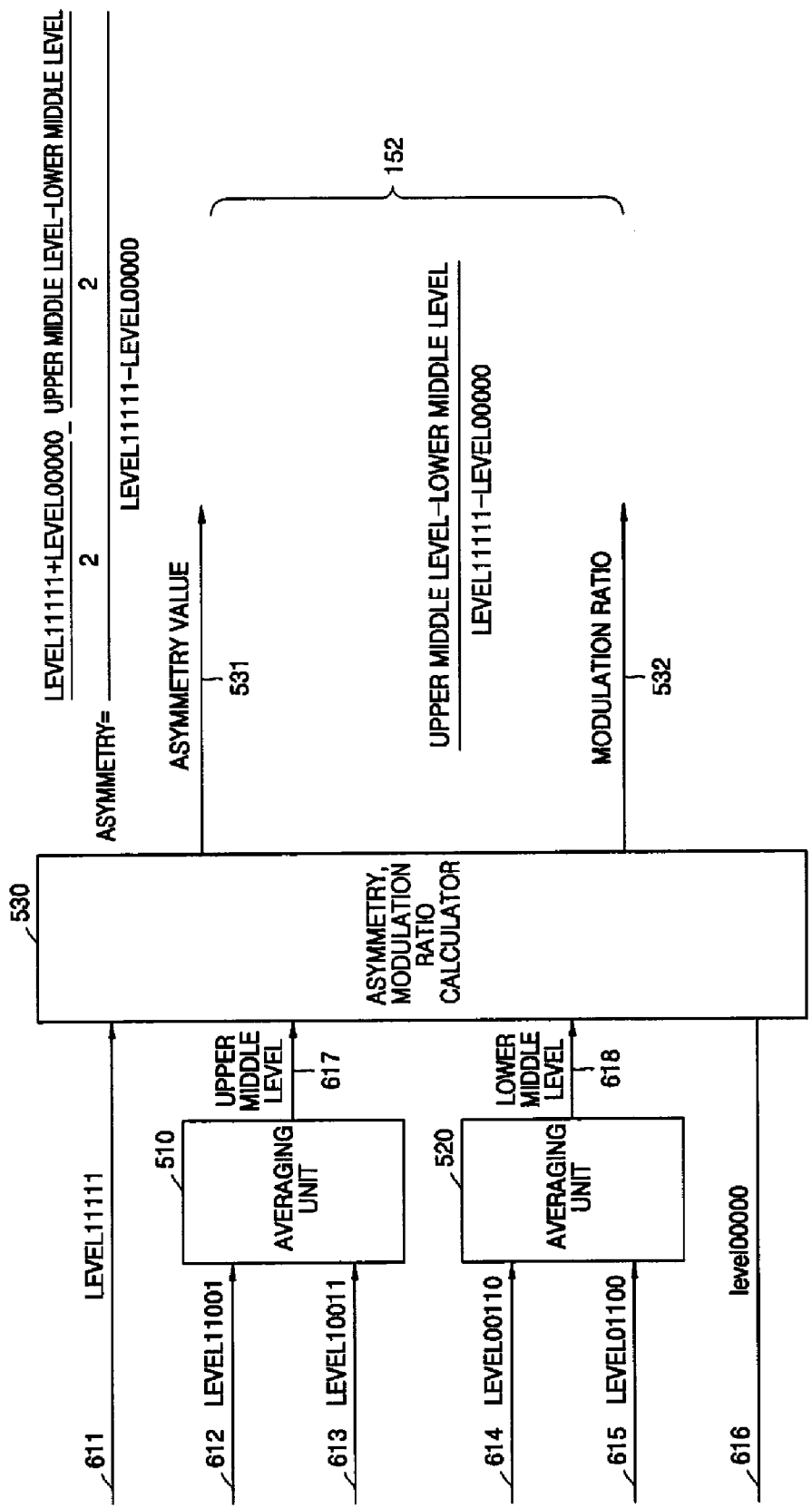
FIG. 6 illustrates a signal quality measuring process using the information calculator according to an aspect when the viterbi decoder of FIG. 4 is used.

FIG. 6 illustrates a signal quality measuring process by the information calculator 150 according to an aspect when the viterbi decoder of FIG. 4 is used. When a 5-tap viterbi decoder is used, an uppermost level 611 is an appropriate level value 203 detected by the channel identifier 170 when an RF signal corresponding to a level of '11111' is input, and a lowest level 616 is an appropriate level value 203 detected by the channel identifier 170 when an RF signal corresponding to a level of '00000' is input.

As described above, according to a code condition, level values corresponding to the shortest T are removed, and only input signals of levels having a number of consecutive bits equal to the shortest T are selected. Accordingly, levels selected to obtain an upper middle level 617 are only '11001' and '10011,' and levels selected to obtain a lower middle level 618 are only '00110' and '01100.' As described above, the levels selected to obtain the upper middle level 617 are the inverse of the levels selected to obtain the lower middle level 618, respectively.

Figure 7:
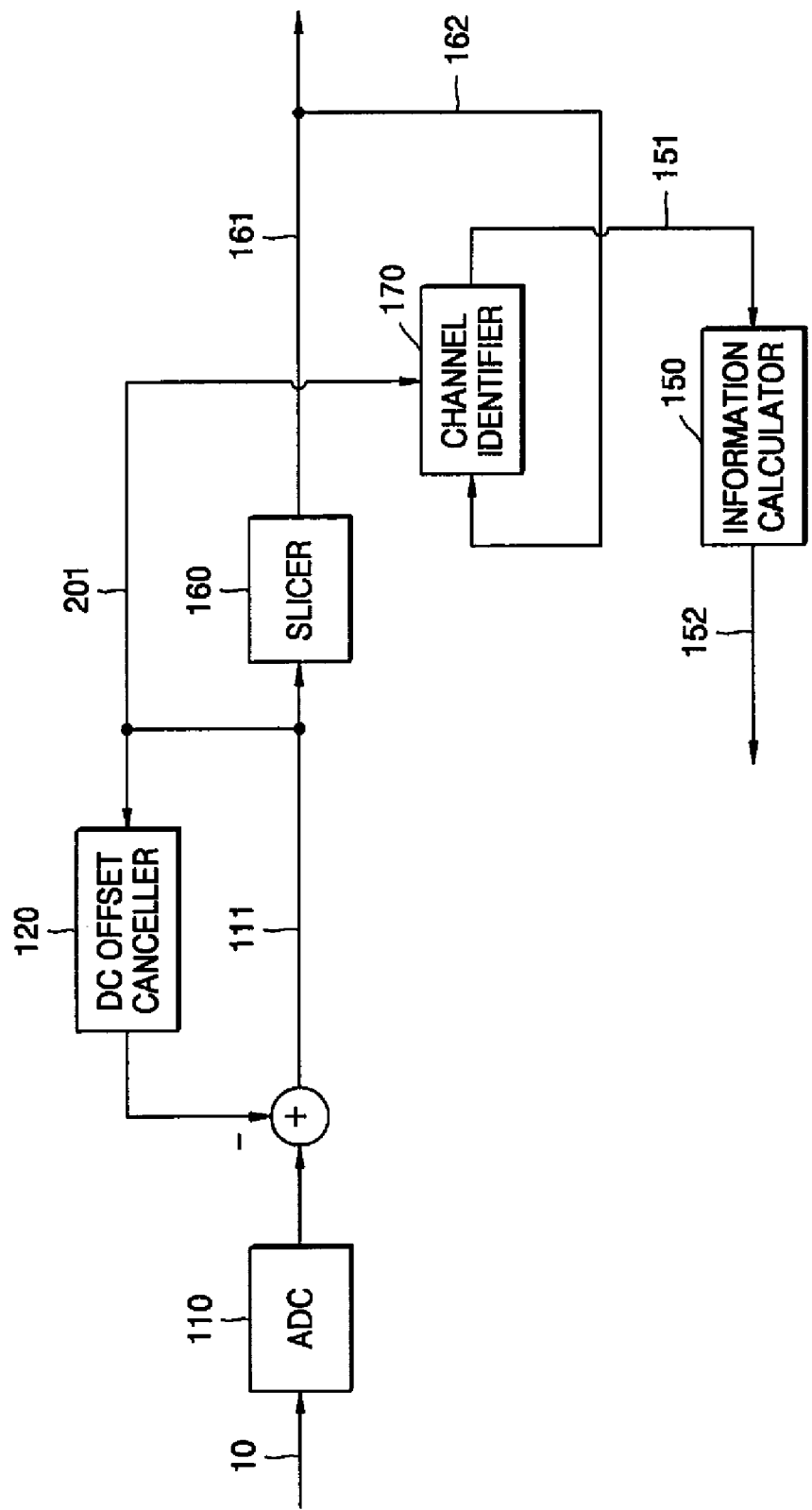
FIG. 7 is a block diagram of a signal quality measuring apparatus according to another aspect.

FIG. 7 is a block diagram of a signal quality measuring apparatus according to another aspect. Unlike the aspect of FIG. 2, in the aspect of FIG. 7, a slicer 160 is included in the apparatus instead of the equalizer 130, and input signals 162 input to the channel identifier 170 are output signals 161 of the slicer 160 not output signals 141 of the viterbi decoder 140.

The slicer 160 determines whether a signal that has been sampling RF signals received during a predetermined time period has a '+' value or a '−' value. The slicer 160 outputs a binary signal as an output signal by generating a '1' if the signal has the '+' value and a '0' if the signal has the '−' value. In general, an error rate is higher when an output signal of the slicer 160 is used as an input signal of the channel identifier 170 than when a case where an output signal of the viterbi decoder 140 is used as an input signal of the channel identifier 170. However, since a difference of the error rates is so small, the difference does not influence the signal quality measurement; therefore, the aspect shown in FIG. 7 is used. In general, since many calculating circuits and/or a long time is required for decoding calculation of the viterbi decoder 140, in the aspect as shown in FIG. 7, it is possible to measure comparatively exact signal quality with less resources.

Figure 8:
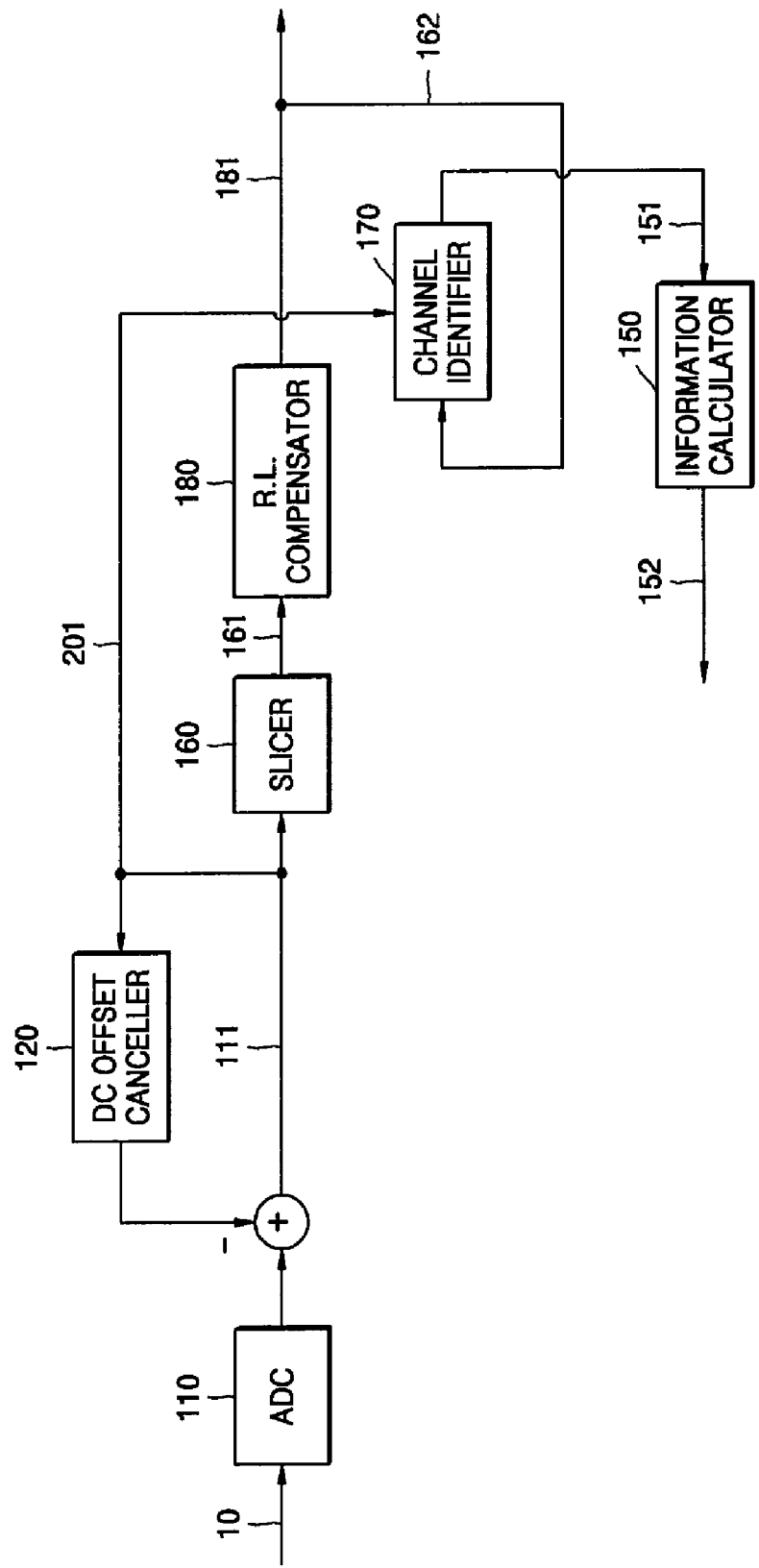
FIG. 8 is a block diagram of a signal quality measuring apparatus according to another aspect.
Figure 9:
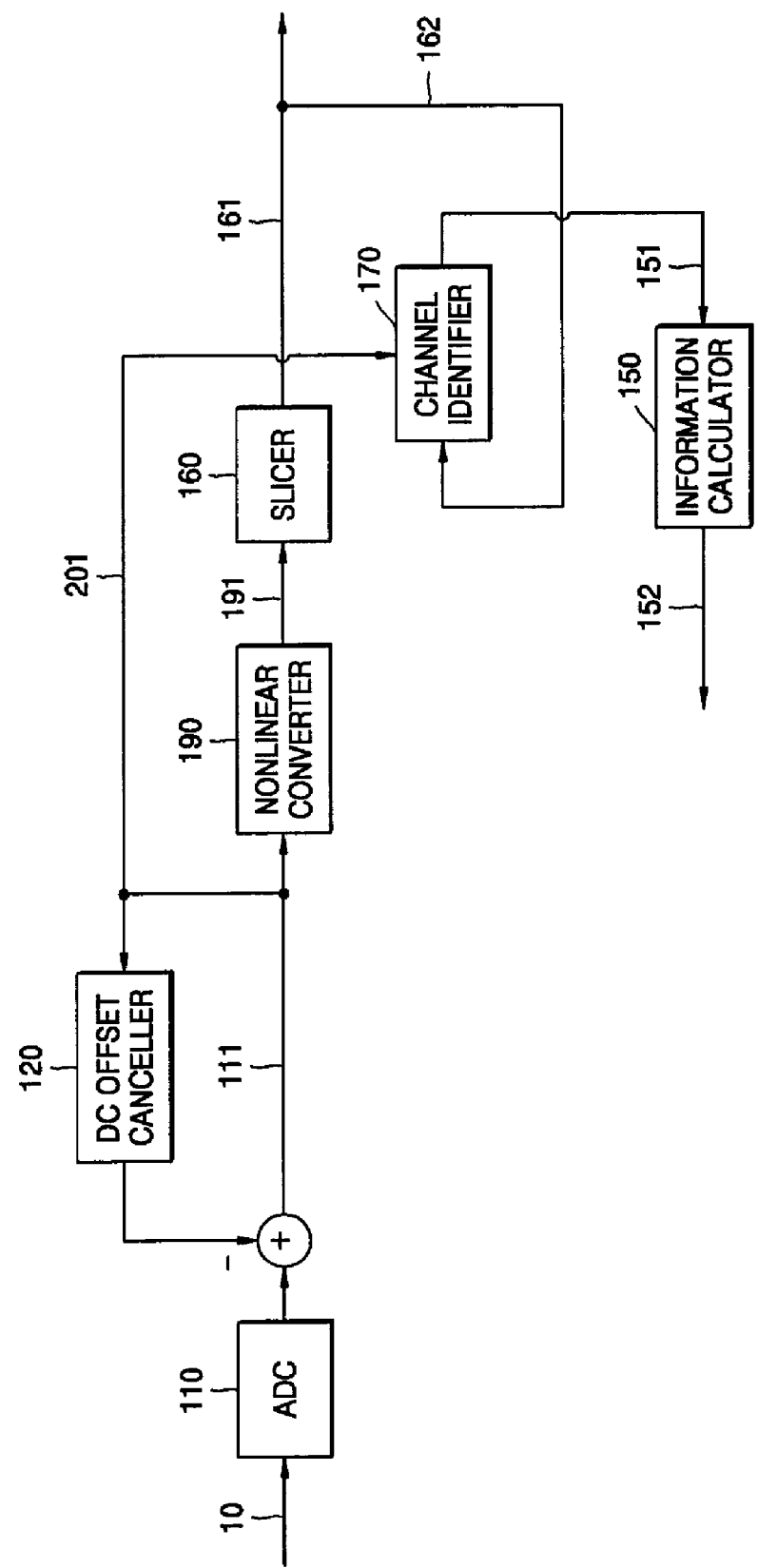
FIG. 9 is a block diagram of a signal quality measuring apparatus according to another aspect.

When the output signals 161 of the slicer 160 are used as the input signals 162 of the channel identifier 170, a signal quality measuring apparatus as shown in FIG. 8 or 9 can be used to reduce a signal error rate.

FIG. 8 is a block diagram of a signal quality measuring apparatus according to another aspect. The signal quality measuring apparatus shown in FIG. 8 is similar to the signal quality measuring apparatus shown in FIG. 7. However, in the signal quality measuring apparatus of FIG. 8, a run length compensator 180 is provided after the slicer 160 of the signal quality measuring apparatus of FIG. 7.

The run length compensator 180 is a circuit to correct '+/−' of a signal that the slicer 160 has wrongly determined due to an external condition. That is, when a signal of the shortest T that must not be included in the output signals 161 of the slicer 160 is included in the output signals, the run length compensator 180 operates. The run length compensator 180 compares a level value of a signal with a period of time right before or right after the shortest T signal is measured and a level value of a signal with a period of time when the shortest T signal is measured. A binary value corresponding to a level value of a signal having a larger level value of the two difference values is converted into an inverse value and output from the run length compensator 180.

FIG. 9 is a block diagram of a signal quality measuring apparatus according to another aspect. The signal quality measuring apparatus shown in FIG. 9 includes a nonlinear converter 190 in addition to the signal quality measuring apparatus shown in FIG. 7 or 8. The nonlinear converter 190 is provided before the slicer 160.

Figure 10:
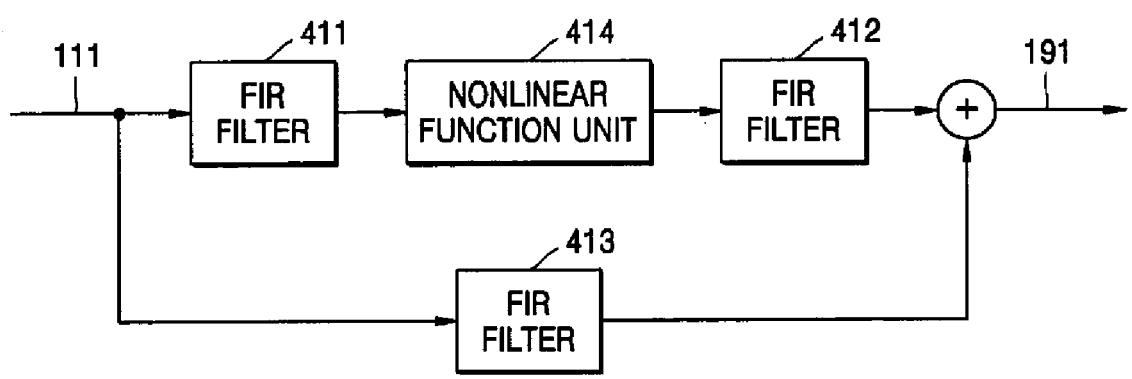
FIG. 10 illustrates a nonlinear converter according to an aspect.

FIG. 10 is a diagram of the nonlinear converter 190 according to an aspect. The nonlinear converter 190 includes 3 FIR filters 411, 412, and 413 and a nonlinear function unit 414.

The nonlinear function unit 414 nonlinearly converts characteristics of an input RF signal 111, and has a conversion function expressed as the following Equation 6:

$$y = x * [\{a=0\}*\{|x|<=k\}+\{a=1\}*\{|x|>k\}]+k*(-1)^{[\{a=0\}*\{|x|<=k\}+\{a=1\}*\{|x|>k\}]*}$$

$$[\{a=0\}*\{|x|>k\}+\{a=1\}*\{|x|>k\}] \quad \text{Equation 6}$$

Here, | | is an operator representing an absolute value, and { } is an operator outputting '1' if a condition formula is true and '0' if the condition formula is false. The 'x', which is an input RF signal, is a real number, and 'k', which is a nonlinear threshold, is '0' or a positive real number. The 'a', which is a value representing a nonlinear type, is '0' or '1.' Equation 6 can be arranged as shown in the following Equation 7:

$$a=0, |x|>k, x>0, y=k$$

$$a=0, |x|>k, x<0, y=-k$$

$$a=0, |x|<k, y=x$$

$$a=1, |x|>k, x>0, y=x-k$$

$$a=1, |x|>k, x<0, y=x+k$$

$$a=1, |x|<k, y=0 \quad \text{Equation 7}$$

The FIR filters 411, 412, and 413 convert frequency characteristics of the input RF signals 111 and enable the nonlinear function unit 414 to operate more efficiently. One or all of the FIR filters 411, 412, and 413 can be omitted, and the number of taps of each filter can be set differently.

As described above, according to aspects of the invention, an apparatus and method for measuring signal quality capable of calculating an asymmetry value and a modulation ratio more precisely are provided. Also, an apparatus and method for measuring signal quality capable of calculating an asymmetry value and a modulation ratio more easily when the shortest T signal is changed are provided.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A signal quality measuring apparatus, comprising:
an analog-to-digital converter configured to convert input radio frequency signals into digital signals;
an equalizer configured to equalize output signals from the analog-to-digital converter and output an equalized signal;
a binary unit configured to generate and output binary signals from the equalized signal;
a channel identifier configured to receive input signals of the equalizer and the binary signals output from the binary unit and output level values to be used as reference levels for the binary unit; and
an information calculator configured to receive the level values and detect a signal quality value of the input radio frequency signals, the signal quality value comprising an asymmetry value of the input radio frequency signals,
wherein the channel identifier is further configured to detect the level values on the basis of the input signals of the equalizer input during a predetermined time period.

2. The apparatus of claim 1, wherein the channel identifier is further configured to detect each level value by obtaining an average value of an input signal of the equalizer and a previous level value.

3. A signal quality measuring method, comprising:
converting input radio frequency signals into digital signals;
equalizing the converted signals;
generating binary signals from the equalized signals;
receiving the converted signals and the generated binary signals and outputting level values to be used as reference levels for a binary unit; and
receiving the level values and detecting a signal quality value of the input radio frequency signals,
wherein the signal quality value comprises an asymmetry value of the input radio frequency signals.

4. The method of claim 3, wherein:
the generating the binary signals is performed by the binary unit, and
the binary unit comprises a viterbi decoder or a slicer.

5. The method of claim 3, wherein the receiving the signals and outputting the level values comprises detecting the level values according to the converted signals input during a predetermined time period.

6. The method of claim 5, wherein the receiving the signals and outputting the level values comprises detecting each level value by obtaining an average value of a converted signal and a previous level value.

7. The method of claim 4, wherein the receiving the signals and outputting the level values comprises:
generating selection signals from the binary signals output from the binary unit;
selecting a level to be detected from the converted signals in response to the selection signals; and
generating new level values for the selected levels according to previous level values and the converted signals transferred by selecting the level.

8. The method of claim 7, wherein the generating the selection signals comprises, if the binary unit is the viterbi decoder, multiplexing delayed signals, which are delayed according to the tap number of the viterbi decoder.

9. The method of claim 7, wherein the average value filtering is performed by low pass filtering.

10. The method of claim 7, wherein the average value filtering comprises:
detecting each level value according to an equation:

level value=previous level value+(delayed input signal−previous level value)/constant number.

11. The method of claim 4, further comprising:
generating an average value of level values having a same digital sum value from among received level values; and
receiving the level values and the average values of the level values and generating the signal quality value.

12. The method of claim 11, wherein the generating the average value comprises removing signals with a shortest period T from binary signals represented by the level values having the same digital sum value.

13. The method of claim 11, wherein the generating the signal quality value comprises:
calculating the asymmetry value according to an equation:

asymmetry value={(uppermost level+lowest level)/2−(upper middle level−lower middle level)/2}/(uppermost level−lowest level).

14. The method of claim 11, wherein the signal quality calculating further comprises calculating a modulation ratio according to an equation:

modulation ratio=(upper middle level−lower middle level)/(uppermost level−lowest level).

15. The method of claim 11, further comprising detecting and compensating signals with a T below a shortest period T that does not coincide with a code condition.

16. The method of claim 15, further comprising converting the converted signals to have a nonlinear response before equalizing the converted signals.

17. The method of claim 16, wherein the converting the converted signals to have a nonlinear response comprises performing a nonlinear function, wherein the nonlinear function is performed using a conversion function according to an equation:

$$y=x*[\{a=0\}*\{|x|<=k\}+\{a=1\}*\{|x|>k\}]+k*(-1)^{[\{a=0\}*\{|x|<=k\}+\{a=1\}*\{|x|>k\}]*}$$

$$[\{a=0\}*\{|x|>k\}+\{a=1\}*\{|x|>k\}]$$

wherein:
{ } is an operator outputting 1 if a condition formula is true and 0 if the condition formula is false,
x is a real number corresponding to the converted signals,
k is a nonlinear threshold equal to zero or a positive real number,
a is a value of 0 or 1 representing a nonlinear type, and
y is a variable.

18. A method of measuring signal quality of a signal reproduced from a medium according to at least one feature of the signal, the method comprising:
converting the signal reproduced from the medium into a digital signal;
equalizing the digital signal;
coding the equalized signal into a binary format;
obtaining a level average value according to both the digital signal and the binary coded signal; and
calculating the quality of the signal reproduced from the medium according to the obtained level average values,
wherein the calculating includes calculating at least one of an asymmetry value and a modulation ratio to measure the signal quality of the signal reproduced from the medium.

* * * * *